(12) United States Patent
Alyagor et al.

(10) Patent No.: US 12,433,304 B2
(45) Date of Patent: Oct. 7, 2025

(54) READY-TO-USE FLY NEONATE LARVAE WITH EXTENDED SHELF-LIFE AND METHODS OF PRODUCING SAME

(71) Applicant: FREEZEM CRYOGENICS LTD., Herzelia (IL)

(72) Inventors: Idan Alyagor, Rehovot (IL); Yoav Politi, Kibbutz Nachshonim (IL); Yuval Gilad, Herzelia (IL); Mirit Biton, Rishon Lezion (IL); Victoria Berkun, Bat Yam (IL)

(73) Assignee: FREEZEM CRYOGENICS LTD., Herzelia (IL)

( * ) Notice: Subject to any disclaimer, the term of this patent is extended or adjusted under 35 U.S.C. 154(b) by 80 days.

(21) Appl. No.: 17/906,145

(22) PCT Filed: Mar. 14, 2021

(86) PCT No.: PCT/IL2021/050276
§ 371 (c)(1),
(2) Date: Sep. 12, 2022

(87) PCT Pub. No.: WO2021/186428
PCT Pub. Date: Sep. 23, 2021

(65) Prior Publication Data
US 2023/0114744 A1 Apr. 13, 2023

Related U.S. Application Data

(60) Provisional application No. 62/989,713, filed on Mar. 15, 2020.

(51) Int. Cl.
*A23K 50/90* (2016.01)
*A01K 67/30* (2025.01)
*A23K 10/30* (2016.01)

(52) U.S. Cl.
CPC .............. *A23K 50/90* (2016.05); *A01K 67/30* (2025.01); *A23K 10/30* (2016.05)

(58) Field of Classification Search
CPC ...... A23K 50/90; A23K 20/105; A01K 67/30; Y02P 60/87
See application file for complete search history.

(56) References Cited

U.S. PATENT DOCUMENTS 6,293,223 B1   9/2001  Blossey

FOREIGN PATENT DOCUMENTS

| CN | 103598148 A | 2/2014 |
|----|-------------|--------|
| CN | 107593620 A | 1/2018 |
| CN | 108041353 A | 5/2018 |
| CN | 109007462 A | 12/2018 |
| CN | 209643626 U | 11/2019 |
| WO | 2018002519 A1 | 1/2018 |
| WO | 2019199309 A1 | 10/2019 |
| WO | 2019234107 A1 | 12/2019 |

OTHER PUBLICATIONS

Makkar (2014, Animal Feed Science and Technology, 197:1-33).*
Abada, Adi; Apr. 2025, BSF rearing made more efficient, Feed & Additive Magazine; https://www.feedandadditive.com/bsf-rearing-made-more-efficient/, 4 pages, accessed May 21, 2025.*
Bass et al., (2007) Optimization of dietary restriction protocols in Drosophila. J Gerontol A Biol Sci Med Sci 62(10): 1071-1081.
Cappellozza et al., (2019) A First Attempt to Produce Proteins from Insects by Means of a Circular Economy. Animals (Basel) 9(5): 278.
Green et al., (2003) Diet nutriment and rearing density affect the growth of black blowfly larvae, Phormia regina (Diptera: Calliphoridae). Eur J Entomol 100(1): 39-42.
Hamano et al., (1994) Relationship between food consumption and molting of the silkworm, Bombyx mori. Proceedings of the Japan Academy, Series B 70(9): 146-150.
Mirth and Riddiford (2007) Size assessment and growth control: how adult size is determined in insects. Bioessays 29(4): 344-355.
Wong et al., (2009) Quantification of food intake in Drosophila. PLoS One 4(6): e6063.
Zdárek and Sláma (1972) Supernumerary larval instars in cyclorrhaphous diptera. Biol Bull 142(2): 350-357.
Barragán-Fonseca Karol B. (2018) Flies are what they eat: Tailoring nutrition of Black Soldier Fly (Hermetia illucens L.) for larval biomass production and fitness. PhD Thesis. Laboratory of Entomology at Wageningen University, the Netherlands, Jun. 2018. 162 pages.
Brits Devon (2017) Improving feeding efficiencies of black soldier fly larvae, Hermetia illucens (L., 1758) (Diptera: Stratiomyidae: Hermetiinae) through manipulation of feeding conditions for industrial mass rearing. MSC Thesis. Faculty of Conservation Ecology and Entomology at Stellenbosch University, South Africa, Mar. 2017. 166 pages.
Cammack and Tomberlin (2017) The Impact of Diet Protein and Carbohydrate on Select Life-History Traits of The Black Soldier Fly Hermetia illucens (L.) (Diptera: Stratiomyidae). Insects 8(2): 56.
Chen et al., (2016) The Combined Effect of Methyl- and Ethyl-Paraben on Lifespan and Preadult Development Period of Drosophila melanogaster (Diptera: Drosophilidae). J Insect Sci 16(1): 15.

(Continued)

*Primary Examiner* — Valarie E Bertoglio
(74) *Attorney, Agent, or Firm* — Rodney J. Fuller; FULLER IP LAW LLC

(57) ABSTRACT

The present invention provides compositions and methods for inducing suspended animation in neonate larvae of beneficial fly, particularly larvae of the Black soldier fly. During the suspended animation, the larvae show extended shelf-life and improved shipment durability. The suspended animation is reversible, and upon exposure to standard rearing conditions the larvae reach comparable maturity to corresponding non-suspended larvae.

4 Claims, 9 Drawing Sheets

(56) References Cited

OTHER PUBLICATIONS

Duzell Matthew (2019); "Hermetia illucens" (On-line), Animal Diversity Web. University of Michigan, Museum of Zoology. Retrieved from: https://animaldiversity.org/accounts/Hermetia_illucens/ on Jan. 2, 2020; 22 pages.

Larouche Jennifer (2019) Processing methods for the black soldier fly (Hermetia illucens) larvae: From feed withdrawal periods to killing methods. Master thesis work. Maîtrise en sciences animales—avec mémoire, Maître es sciences (M. Sc.). Québec, Canada. 99 pages.

Ong et al., (2015) *Drosophila melanogaster* as a model organism to study nanotoxicity. Nanotoxicology 9(3): 396-403.

Zha and Cohen (2014) Effects of Anti-Fungal Compounds on Feeding Behavior and Nutritional Ecology of Tobacco Budworm and Painted Lady Butterfly Larvae. Entomol Ornithol Herpetol 3(1): 1000120.

Food Data Central; Cornmeal, whole-grain, yellow datasheet; SR Legacy, released in Apr. 2018. [online]. USDA Jan. 4, 2019 (herein attached) [retrieved on Jun. 26, 2021]. Retrieved from <https://fdc.nal.usda.gov/fdc-app.html#/food-details/169697/nutrients> Food Data Central Jan. 4, 2019 (Jan. 4, 2019). 8 pages.

\* cited by examiner

READY-TO-USE FLY NEONATE LARVAE WITH EXTENDED SHELF-LIFE AND METHODS OF PRODUCING SAME

FIELD OF THE INVENTION

The present invention provides compositions and methods for inducing suspended animation state in fly neonate larvae, thereby inhibiting the larvae growth and maintaining small size for a long time period. During the suspended animation, the neonate larvae show extended shelf-life and improved shipment durability. The suspended animation is reversible, and upon exposure to standard rearing conditions the larvae reach maturity characteristics comparable to those of corresponding non-suspended larvae grown under the standard conditions for the entire growth period.

BACKGROUND OF THE INVENTION

Insects can be utilized for various applications such as pest management, as protein and oil source in the food and animal feed industries, either as a whole or as extracts, production of materials for the pharmaceutical and cosmetic industries, waste reduction, production of fertilizers for agriculture, and more.

In order to support mass production of insects for these applications, their farming must be industrialized and scaled-up. Most of the insect factories today employ in-site growth of the organism for its entire life-cycle (breeding) in order to produce the larvae required for various utilities.

Yield of insect laid eggs can vary dramatically from week to week and insect colonies often suffer from reduced productivity or even sudden collapse. This makes the reproduction of insects at the end-product manufacturing site inefficient and costly, and requires constant over-production of eggs in order to keep up with the production demand. Furthermore, some species have short larval stage or entire life-cycle and are sensitive to environmental conditions, making the task of breeding and storing insects difficult.

In the case of Black soldier flies (*Hermetia illucens*, BSF), locating the breeding site in proximity to the rearing and processing facility, significantly affects the size of the factory and its operational complexity. In addition, it also limits the minimal economically viable production capacity of such facility.

There is an ongoing attempt to efficiently grow and store live larvae at commercial quantities. For Example, International (PCT) Patent Application Publication No. WO 2019/234107 discloses storage means for live insect larvae. The storage means comprises cooling medium, e.g., water, wherein the amount of water in the larvae-water mixture in said storage means is controlled to be between 30% and 80%. The content of the storage means is maintained at a temperature below 15° C. and is agitated. WO 2018/002519 discloses a rearing tray for the automated breeding of insect larvae in a juvenile state and an adult state.

The nutrition provided to the larvae may have, among other factors, impact on the larvae storability and shelf-life duration. For example, International (PCT) Patent Application Publication No. WO 2019/199309 discloses a composition for storage of black soldier fly larvae, comprising a container, a layer of fermented nutrient source in the bottom of the container (the bottom layer), black soldier fly larvae on top of the layer of fermented nutrient source (the middle layer), a layer of dry nutrient source on top of the black soldier fly larvae (the top layer), and a cover on top of the container that allows air to pass into and out of the container, wherein the nutrient source is about 50% wheat bran, 30% alfalfa meal and 20% corn meal by volume.

There is a need for, and it would be highly advantageous to have, compositions, methods and systems for prolonging the neonate period of insect, particularly fly larvae, while maintaining high survival rate, thereby extending their shelf-life and improving shipment thereof.

SUMMARY OF THE INVENTION

The present invention fulfills the need for an economical and efficient way to generate stocks and transport larvae of beneficial flies, particularly Black Soldier Fly (BSF, *Hermetia illucens*), which are required in mass quantities for agricultural, medicinal, and research use and for use as feed, food or as a food product ingredient. Larvae are widely used as waste decomposers and as a protein source. The present invention provides composition and methods for prolonging the duration of neonate larvae development, thus extending their shelf-life without negatively affecting the larvae properties. The present invention further provides neonate larvae at a state of suspended animation which are capable of reversing to normal development and growth at a required timing according to the intended use. The compositions and methods of the present invention advantageously are suitable for cold-sensitive and/or short life-cycle species. These properties enable shipment of neonate larvae both domestically and internationally, and enable rearing and processing facilities that do not require an integral breeding unit. These properties also enable management of the life cycle for mass rearing stock management or lab purposes.

The present invention is based in part on the unexpected discovery that specific feed compositions prolong the first instar larval stages of *Hermetia illucens* (Black soldier fly) for at least 14 days, while maintaining their capability to proceed to advance growth stages. The composition comprises at least one preservative and a gelling agent that provides for high content of aqueous solution while the composition is devoid of free liquid. Once the neonate larvae induced for suspended animation were transferred to standard rearing feed, the larvae began to develop and mature normally. The methods of the present invention are advantageous over hitherto known methods for inducing suspended animation state in larvae, specifically for larvae transportation, at least in that the compositions and methods are applicable at a medium- to large scale reproducible production of larvae; the production results in a reproducible high percentage of viable neonate larvae at a desired size comparable to the percentage and size obtained by growing corresponding larvae under standard conditions; and the larvae can be easily transported at high density.

The present invention further provides a container for shipment of neonate larvae characterized by enabled air exchange while affording limited humidity evaporation from the feed composition inducing suspended animation comprised therein. A significant advantage of the compositions and methods of the present invention resides in the fact that the suspended larvae have relatively low metabolic rate and thus can be kept at a high larval density per growth area, which allows for lower shipping costs as well as predictable expanses.

According to one aspect, the present invention provides a feed composition for inducing suspended animation state in fly neonate larvae, comprising at least one insect larva-compatible preservative and at least one gelling agent.

According to certain embodiment, the feed composition comprises at least one carbohydrate and at least one protein or at least one source thereof, wherein the protein content is up to 20% w/w based on the dry weight of the composition. Without wishing to be bound by any specific theory or mechanism of action, the low protein content of the composition contributes to the induction of suspended animation.

According to some embodiments, the carbohydrate to protein ratio in the feed composition is from about 18:1 to 1:1.

According to certain embodiments, the insect larva-compatible preservative is a food-grade or a cosmetic-grade preservative.

According to certain embodiments, the food-grade or cosmetic-grade preservative is selected from the group consisting of parabens, benzoates, propionic acid and/or salts thereof (propionates), sulfites, nitrates, nitrites, sorbates and any combination thereof. Each possibility represents a separate embodiment of the present invention.

According to some embodiments, the food-grade or cosmetic-grade preservative is a paraben selected from the group consisting of methylparaben, ethylparaben, propylparaben, butylparaben, heptylparaben, isobutylparaben, isopropylparaben, benzylparaben, salts thereof and any combination thereof. Each possibility represents a separate embodiment of the present invention. According to certain exemplary embodiments, the preservative is methylparaben and/or salts thereof.

According to additional certain exemplary embodiments, the food-grade or cosmetic-grade preservative is propionic acid and/or salts thereof.

According to certain currently exemplary embodiments, the feed composition comprises methylparaben and/or salts thereof and propionic acid and/or salts thereof.

According to certain embodiments, the at least one gelling agent is selected from the group consisting of agar, agarose, alginate, carrageenan, gum arabic, gum ghatti, gum tragacanth, gellan gum, xanthan gum, pectin, guar, methylcellulose, carboxy methylcellulose and locust bean gum. Each possibility represents a separate embodiment of the present invention. According to certain exemplary embodiments, the gelling agent is agar. According to certain currently exemplary embodiments, the gelling agent is agar. Without wishing to be bound by any theory or mechanism of action, the gelling agent provides for the ability of the composition to comprise high content of an aqueous solution, particularly water, while being devoid of a liquid phase. The high content of aqueous solution provides for the humidity required to maintain the viability of the larvae being at the suspended animation state.

Any carbohydrate and protein sources known to be suitable for rearing fly larvae can be used according to the teachings of the present invention.

According to certain embodiments, the source for carbohydrates and proteins is selected from the group consisting of plant-derived flour, whole yeast preparation, yeast extract and any combination thereof.

According to certain embodiments, the plant-derived flour is obtained from a plant selected from the group consisting of corn, wheat, rye, soybean, oat and a combination thereof. According to certain exemplary embodiment, the plant-derived flour is corn flour.

According to certain embodiments, the at least one carbohydrate is a soluble carbohydrate. According to certain embodiments, the at least one soluble carbohydrate is selected from the group consisting of molasses, sucrose, brown sugar, starch, honey, fructose and any combination thereof. Each possibility represents a separate embodiment of the present invention. According to certain embodiments, the soluble carbohydrate is molasses. According to certain embodiments, the soluble carbohydrate is brown sugar.

According to certain exemplary embodiments, the feed composition comprises at least one preservative selected from the group consisting of methylparaben, propionic acid and salts thereof, at least one gelling agent, at least one carbohydrate and at least one protein or a source thereof, wherein the protein content is up to 20% w/w based on the dry weight of the composition. According to certain exemplary embodiments, the gelling agent is agar. According to certain embodiments, the carbohydrate to protein ratio is 10:1.

According to certain exemplary embodiments, the feed composition comprises methylparaben and/or propionic acid and/or salts thereof, at least one gelling agent, corn flour, dry yeast, and molasses.

The feed composition inducing suspended animation of the present invention can be in a form of a premixed dry composition or in a form of a ready-to-use composition.

According to certain embodiments, the feed composition of the invention is in a dry form. According to these embodiments, the dry composition is hydrated with an aqueous solution before use. According to certain embodiments, hydration is formed with an aqueous solution at a temperature of from about 70° C. to about 100° C.

According to certain embodiments, when the at least one preservative comprises paraben, particularly methylparaben, the dry feed composition is essentially devoid of the paraben. According to these embodiments, the paraben is added after the dry composition is hydrated as described hereinabove, at a temperature of below 70° C.

According to certain embodiments, the content of the at least one gelling agent in the dry premixed feed composition is from about 1% to about 30% w/w based on the total dry weight of the composition.

According to certain embodiments, the content of the at least one insect larva-compatible preservative in the dry premixed feed composition is from about 0.2% to about 10% w/w based on the total dry weight of the composition.

According to certain exemplary embodiments, the aqueous solution is water. According to some embodiments, the dry feed composition is hydrated to form a semi-solid or solid gel composition comprising aqueous solution at from about 35% to about 90% w/w based on the total wet weight of the composition.

According to certain embodiments, the feed composition is in a form of a ready-to-use feed composition comprising an aqueous solution. According to these embodiments, the ready-to-use feed composition is in a form of a semi-solid or solid gel comprising high content of an aqueous solution, wherein said feed composition is devoid of a liquid phase. Without wishing to be bound by any specific theory or mechanism of action, the gelling agent, particularly agar, provides for the high-water content of the feed without generating liquid phase.

According to certain embodiments, the ready-to-use feed composition comprises from about 35% to about 90% aqueous solution w/w based on the total wet weight of the composition.

According to certain exemplary embodiments, the aqueous solution is water.

According to certain embodiments, the amount of the gelling agent in the ready-to-use feed composition is from about 0.1% to about 3% w/w based on the total wet weight of the composition.

According to certain embodiments, the amount of the at least one insect larva-compatible preservative in the ready-to-use feed composition is from about 0.01% to about 6.5% based on the total wet weight of the composition.

The feed composition inducing suspended animation according to the teachings of the present invention is suitable for growing larvae of beneficial flies of a variety of species, particularly larvae of *Hermetia illucens* (Black soldier fly, BSF).

According to certain exemplary embodiments, the larva is BSF larva.

According to certain embodiments, the feed composition induces reversible suspended animation on larvae consuming said feed composition. According to these embodiments, the larvae mature normally upon transferal to common rearing feed, reaching size and function comparable to corresponding larvae fed on a common feed throughout their development. Common feed suitable for rearing fly larvae are known to a person skilled in the Art. According to certain embodiments, the common feed comprises more that 15%, typically more than 20% protein.

The present invention further provides larvae produced by the methods of the invention.

Any container as is known in the art for growing and/or shipping larva can be used with the feed composition of the present invention. Such container should provide air exchange, and prevent the escapes of neonate larvae.

According to certain embodiments, said feed composition ingredients promote the maintenance of humidity inside the container. Without wishing to be bound by any specific theory or mechanism of action, the gelling agent, particularly agar of the feed composition promotes the maintenance of humidity inside the container.

According to another aspect, the present invention provides a method for inducing a suspended animation state in a fly neonate larva, comprising placing a fly egg and/or larva on a feed composition inducing suspended animation, the composition comprising at least one insect larva-compatible preservative and at least one gelling agent, wherein the feed composition is in a semi-solid or solid gel form comprising at least 35% w/w aqueous solution based on the total weight of said composition. According to certain exemplary embodiments, the aqueous solution is water.

The insect larva-compatible preservative is as described hereinabove. According to certain embodiments, the preservative is selected from the group consisting of food grade and/or cosmetic grade paraben, particularly methylparaben and/or salts thereof; propionic acid and/or salts thereof; and a combination thereof.

The gelling agent is as described hereinabove. According to certain exemplary embodiments, the gelling agent is agar. According to certain currently exemplary embodiments, the fly larvae is of *Hermetia illucens* (Black soldier fly).

The feed composition inducing suspended animation is as described hereinabove.

According to certain embodiments, the larva placed on the feed composition is at the first instar developmental stage. According to certain exemplary embodiments, the larva is placed on the feed composition within a time period of right after hatching to about 12 h after hatching. According to other exemplary embodiments, the eggs are placed directly above the feed composition. According to these embodiments, the eggs are hatched on the feed composition.

According to certain embodiments, the larvae ambient temperature is from about 4° C. to about 35° C. According to certain embodiments, the ambient temperature is 10-30° C. According to certain exemplary embodiments, the neonate larva remains at the suspended animation stage as long as placed on the feed composition. According to certain exemplary embodiments, the neonate larva remains at the suspended animation stage as long as placed on the feed composition at an ambient temperature of from about 20° C. to about 30° C. According to some embodiments, the neonate larva remains viable at a size characteristic to an instar stage of between the first to the fourth instar stage. According to certain exemplary embodiments, when the larva is of BSF, the neonate larva size is maintained at between 2-8 mm as long as placed on the feed composition of the invention. It is to be explicitly understood that the larva being at suspended animation period is viable, and the suspended animation is reversible.

According to certain exemplary embodiments, the larva consumes the feed composition. According to further certain exemplary embodiments, the feed composition inducing suspended animation is the neonate larvae only nutrient source.

According to further exemplary embodiments, upon transmittal of the neonate larva from the feed composition inducing suspended animation to a common rearing feed, the larva develops normally throughout the remaining larval stage and optionally up to maturity. According to certain embodiments, the larva is transferred to a common rearing feed to reach the fifth instar stage.

According to certain embodiments, at least 70%, at least 75%, at least 80% or at least 85% of the neonate larvae placed on the feed composition inducing suspended animation of the present invention and thereafter transferred to a common rearing feed composition reach a size and/or developmental stage comparable to the size and/or developmental stage of a corresponding larva grown on common rearing feed for the entire growth period.

According to certain embodiments, the desired developmental stage is the larva fifth instar stage. According to certain embodiments, the desired developmental stage is the larva sixth instar stage.

Any container as is known in the art for growing and or shipping larva can be used with the methods of the present invention.

According to certain embodiments, the method comprises placing a plurality of eggs and/or neonate larvae on the feed composition inducing suspended animation. According to these embodiments, the larvae are placed at a density of from about 100 to about 5000 larvae per $cm^2$ of the feed composition.

According to certain embodiments, the method comprises placing a plurality of larvae only. According to alternative embodiments, the method comprises placing a plurality of eggs only.

According to another aspect, the present invention provides a system for shipment and/or storage of beneficial fly larvae, comprising a container, feed composition inducing suspended animation according to the teachings of the present invention and a plurality of neonate larva.

According to certain embodiments, the system is suitable for storage of the beneficial fly larvae for about 1-20 weeks, wherein the larvae are at a suspended animation stage.

According to certain embodiments, the feed composition and the plurality of neonate larvae are placed within the container.

According to certain embodiments, the container of said system comprises at least one wall enabling gas exchange with the environment. According to these embodiments, the at least one wall is comprised of at least partly perforated material. According to certain exemplary embodiments, the at least one wall is made of a net. According to certain embodiments, the net comprises pores of 50-100 µm. According to certain embodiments, the perforated material is selected from the group consisting of cellulose acetate, low-density polyethylene (LDPE) and cellulose. Each possibility represents a separate embodiment of the present invention. According to certain currently exemplary embodiments, the at least one wall comprised of at least partially perforated material is the top wall of the container.

According to certain embodiments, the container comprises a flat bottom intact wall, and a wall comprised of at least partially perforated material at the top of the container. According to these embodiments, the container comprises the feed composition inducing suspended animation at the bottom of the container, neonate larvae and/or eggs on top of the feed, void volume sufficient to contain oxygen and relatively uniform moisture, and a top wall comprised of at least partially perforated material.

According to certain embodiments, the container material is selected from the group consisting of: organic polymers, glass, plastic, metal, or any combination thereof.

According to certain embodiments, the perforated material allows for gas exchange within the container while limiting the humidity evaporation from the feed composition. According to further embodiments, the container is impermeable to liquid.

According to certain embodiments, the volume of the container is between 100 ml to 5,000 ml.

According to certain embodiments, the container has straight walls, tapered walls or irregular walls.

According to certain embodiments, fly eggs are placed on top of the feed composition inducing suspended animation. The eggs may contain embryos at any developmental stage.

The standard rearing conditions and common feed ingredients will be determined according to the fly species as is known to a person skilled in the art.

It is to be understood that any combination of each of the aspects and the embodiments disclosed herein is explicitly encompassed within the disclosure of the present invention.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1B:
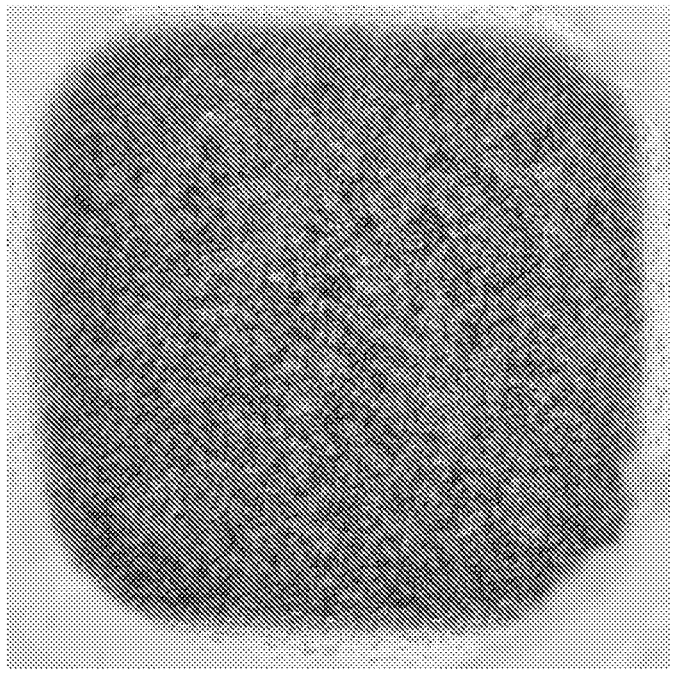
FIG. 1 shows larvae 4 days after being placed on standard feed (FIG. 1A) or on the feed composition for inducing suspended animation (FIG. 1B).

The present invention answers the hitherto unmet need of industries involved in mass production of insect larvae, particularly fly larvae for reliable and reproducible systems and methods for maintaining hatched larvae at a viable state for sufficient time. Particularly, the need is for maintaining viable larvae for time periods of from several days to up to couple of months.

The present invention provides feed compositions, which, when provided to fly larvae shortly after hatching induce in the larvae a suspension animation state. The feed composition inducing suspended animation comprises at least one insect larva-compatible preservative and at least one gelling agent and proteins at a content of up to about 20% w/w based on the dry weight of the composition. The present invention further provides methods for inducing suspended animation state in neonate larvae as well as a system for shipping and storing said larvae, comprising a container and said feeding composition. According to the teaching of the present invention, the suspended animation is reversible upon transferal of the larvae to standard rearing conditions, where the larvae regain normal development.

Definitions

The term "fly" as used herein refers to a fly of the order Diptera. According to certain embodiments, the fly is *Hermetia illucens* (Black soldier fly).

As used herein, the term "neonate larvae" refers to insect larvae, particularly fly larvae, from the time of hatching until first molting.

As used herein, the term "agar" refers to a gelling agent (also referred to as solidifying agent) composed of agarose (a linear polymer made up of the repeating unit of agarobiose, a disaccharide made up of D-galactose and 3,6-anhydro-L-galactopyranose) and agaropectin (a sulphated galactan mixture).

The term "instar" as used herein refers to a developmental stage between molts of insects, more particularly of larval forms of holometabolous insects, until reaching sexual maturity. The larvae pass through six instars. Larvae at the first instar (recently emerged from their eggs) are opaque, creamy white, with a reddish-brown head. At the fifth instar full size of the larvae is reached and has a shagreened appearance that is greyish yellow in color. Black soldier fly normally reaches full size 14-21 days after egg emergence, at the fifth instar. The length of the fifth instar larva reach 17-25 mm length, depending on sex, feed source and subspecies. The larva life ends at the sixth instar stage after which it becomes pupa.

The term "larva ambient temperature" refers to the temperature felt by the larva. It is to be explicitly understood that the term may refer to the temperature within a container in which the larva is placed and/or to the ambient temperature in which the container is placed or the ambient temperature around a surface on which the larvae are placed.

As used herein, the term "ready-to-use" with reference to the feed composition of the invention refers to said composition comprising an aqueous solution. According to certain embodiments, the aqueous solution is water. According to certain exemplary embodiments, the ready-to-use feed composition inducing suspended animation of the invention is in a form of a solid or semi-solid gel.

As used herein, the term "about" is to be understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. All values provided herein are understood to be modified by the term about.

According to certain currently exemplary embodiments, the systems and method of the present invention are used for maintaining viable larvae of *Hermetia illucens* (Black soldier fly).

Black soldier flies (BSFs) are used in the industry as an alternative protein source for feed food and for waste reduction. Unfortunately, BSFs suffer from variation in egg production and their eggs/neonates cannot be stored for more than a few days (eggs hatch 3-4 days after laying, neonates must eat about 24 hours after hatching). BSFs are also very sensitive to cold conditions throughout the early stages of their life-cycle. Therefore, exposing BSF eggs or neonate larvae to low temperatures may be fatal. Currently, there is no satisfactory ability to produce BSFs in a central production plant and ship them to remote end-users, for example at the waste decomposition facility or at the protein factory.

The present invention is based in part of the unexpected discovery that a feed composition comprising agar, at least one paraben, low protein content and sufficient moisture confers suspended animation state in larvae of the black soldier fly when placed on the feed composition several hours after the larvae hatched from the eggs.

Suspended animation is a temporary slowing or stopping of biological function causing a developmental arrest, which may be short- or long-term, so that the physiological capabilities are preserved. As used herein, the term refers to a prolonged first/second instar larval stage, from a typical duration of about 1-4 days to about at least 7 days, at least 14 days, at least 21 days, or at least 28 days and up to about 140 days. Each possibility represents a separate embodiment of the present invention.

According to one aspect, the present invention provides a feed composition for inducing suspended animation state in fly neonate larvae, comprising at least one insect larva-compatible preservative and at least one gelling agent. According to certain embodiments, the insect larva-compatible preservative is a food-grade or a cosmetic-grade preservative.

According to certain embodiments, the feed composition comprises at least one carbohydrate and at least one protein or a source thereof, wherein the protein content is up to 20% w/w based on the dry weight of the composition.

According to certain embodiments, the protein content is up to 15%, up to 16%, up to 17%, up to 18%, or up to 19% w/w based on the dry weight of the composition.

According to certain embodiments, the protein content is between 5%-20% w/w based on the dry weight of the composition. According to certain exemplary embodiments, the protein content is about 8% w/w based on the dry weight of the composition.

According to certain embodiments the carbohydrate to protein ratio is from about 18:1 to 1:1. According to some embodiments the carbohydrate to protein ratio is from about 15:1 to 1:1. According to some embodiments the carbohydrate to protein ratio is from about 10:1 to 1:1.

The protein content of the feed composition of the invention is lower compared to the protein content found in common feed compositions known to be suitable for feeding fly larvae, including chick feed, Gainesville House Fly Diet and the like. Without wishing to be bound by any specific theory or mechanism of action, the low protein and the high carbohydrate to protein ratio may contribute to the ability of the feed composition of the invention to induce suspended animation.

Any food grade preservative as well as a cosmetic preservative that are compatible with insect larvae, particularly fly larvae and specifically BSF larvae, not having fatal effect on fly larvae, can be used according to the teachings of the present invention.

According to certain embodiments, the preservative is selected from the group consisting of a paraben, a benzoate, a propionic acid or a salt thereof (a propionate), a sulfite, a nitrate, a nitrite, a sorbate and any combination thereof. Each possibility represents a separate embodiment of the present invention.

Food grade or cosmetic grade parabens and/or propionic acid and/or salts thereof are currently preferred exemplary embodiments of the invention.

According to certain embodiments, the at least one preservative is methylparaben.

According to certain embodiments, the at least one preservative is propionic acid.

According to certain exemplary embodiments, the feed composition comprises a combination of the preservatives methylparaben and propionic acid.

Parabens, alkyl-esters of p-hydroxybenzoic acid, mainly including methylparaben (MP), ethylparaben (EP), and propylparaben (PP), have been widely used as preservatives in foods, pharmaceuticals, cosmetics, and industrial products because of their broad antimicrobial spectra with relatively low toxicity, good stability, and non-volatility.

Studies investigated the effect of parabens on *Drosophila melanogaster* as an invertebrate model organism found that individual MP had toxic effects on the fecundity and development of fruit flies, and combination of MP and EP had the potential additive toxicity on lifespan and pre-adult development period for *D. melanogaster* (Chen Q. et al., 2016. Journal of Insect Science 16(1): 15; 1-8). Zha et al. investigated the effect of MP as an anti-fungi agent added to the nutrition of reared larvae, and showed a decreased acceptance of diet containing high concentrations of MP in Budworm and Painted Lady Butterfly larvae (Zha C. and Cohen A C., 2014. Entomology, Ornithology & Herpetology 3(1):120).

According to certain embodiments, the paraben is selected from the group consisting of methylparaben, propylparaben, ethylparaben, butylparaben, heptylparaben, isobutylparaben, isopropylparaben, benzylparaben, salts thereof and any combination thereof. Each possibility represents a separate embodiment of the present invention. According to certain exemplary embodiments, the paraben is methylparaben and/or salts thereof.

The feed composition of the invention can be provided as a premixed dry composition which needs to be hydrated with an aqueous solution, particularly water, before use, or as a ready-to-use composition comprising the aqueous solution.

According to certain embodiments, the content of the at least one insect larva-compatible preservative in the dry premixed feed composition is from about 0.2% to about 10% w/w based on the total dry weight of the composition. According to certain embodiment, the content of the preservative or of a combination of preservatives is from about 0.5% to 8.5% w/w based on the total dry weight of the composition. According to some embodiment, the content of the preservative or of a combination of preservatives is from about 1% to 5% w/w based on the total dry weight of the composition.

According to certain embodiments, the preservative or a combination of preservatives is added to the feed composition formulated as ready-to-use at an amount of from about 0.01% to about 10% out of the total weight of the composition. According to certain embodiments, the preservative or a combination of preservatives is added to the feed composition formulated as ready-to-use at an amount of from about 0.01% to about 6.5% out of the total weight of the composition. According to some embodiments, the amount of the preservative or combination of preservatives is from 0.10% to 3% w/w based on the total weight of the composition. According to certain exemplary embodiments, the preservative or a combination of preservatives is added to the feed composition at an amount of from about 0.10% to about 0.15% w/w out of the total weight of the composition.

When the feed composition of the invention is in a dry form, the dry premix is hydrated with an aqueous solution before use. According to certain embodiments, hydration is formed with an aqueous solution at a temperature of from about 70° C. to about 100° C. The temperature of the aqueous solution would depend on the gelling agent, as to obtain a semi-solid or solid gel form of the hydrated feed composition. According to certain embodiments, the dry composition is hydrated with the aqueous condition under boiling conditions at temperature of 90° C.-100° C.

Parabens are poorly soluble in aqueous solution. Accordingly, when the preservative or combination of preservatives comprises paraben, particularly methylparaben, the dry feed composition is devoid of the paraben. According to these embodiments, the dry premix is hydrated with an aqueous solution at a temperature of from about 70° C. to about 100° C., typically about 100° C.; then the obtained solution is cooled to below 70° C.; and the paraben, typically dissolved in organic solvent is added to the cooled solution.

According to certain embodiments, the content of the at least one gelling agent in the dry premixed feed composition is from about 1% to about 30% w/w based on the total dry weight of the composition. According to certain embodiments, the content of the at least one gelling agent in the dry premixed feed composition is from about 1% to about 20% w/w based on the total dry weight of the composition. According to some embodiments, the content of the at least one gelling agent in the dry premixed feed composition is from about 1% to about 10% w/w based on the total dry weight of the composition.

According to certain embodiments, the gelling agent is added to the feed composition formulated as ready-to-use at an amount of from about 0.1% to about 5% out of the total weight of the wet composition. According to certain embodiments, the gelling agent is added to the feed composition formulated as ready-to-use at an amount of from about 0.1% to about 3% out of the total weight of the wet composition. According to certain embodiments, the amount of the gelling agent is from about 0.3% to about 1.5% w/w based on the total weight of the composition. According to certain exemplary embodiments, the amount of the gelling agent is about 0.5% w/w based on the total weight of the wet composition.

Gelling agents that can be used for obtaining a semi-solid or solid culture medium are known in the art. According to certain embodiments, the gelling agent is selected from the group consisting of agar, agarose, alginate, carrageenan, gum arabic, gum ghatti, gum tragacanth, gellan gum, xanthan gum, pectin, guar, methylcellulose, carboxy methylcellulose and locust bean gum. Each possibility represents a separate embodiment of the present invention. According to certain exemplary embodiments, the gelling agent is agar.

According to certain embodiments, the source for carbohydrates and proteins is selected from the group consisting of plant-derived flour, whole yeast preparation, yeast extract, molasses and any combination thereof.

According to certain embodiments, the at least one carbohydrate is a soluble carbohydrate. According to certain embodiments, the at least one soluble carbohydrate is selected from the group consisting of molasses, sucrose, brown sugar, starch, honey, fructose and any combination thereof. Each possibility represents a separate embodiment of the present invention. According to certain embodiments, the soluble carbohydrate is molasses. According to certain embodiments, the soluble carbohydrate is brown sugar.

Molasses are typically made from sugarcane or sugar beets. Molasses may contain different amount of sugar due to the age of the plant and extraction method. Molasses made from other sources can also be used with the compositions and methods of the present invention. According to some embodiments, the feed composition inducing suspended animation contains molasses. Various molasses types can be used in the feed composition, as is known to a person skilled in the art, including, but not limited to, sulphured molasses, unsulphured molasses, light molasses, dark molasses or blackstrap molasses. According to certain exemplary embodiments, the molasses used according to the teachings of the present invention is unsulfured sugarcane molasses. According to certain embodiments, the at least one molasses type serving as a carbohydrate and protein source is added to the feed composition formulated as a dry premixed composition or as a ready-to-use composition at a content of from about 5% to about 20% out of the total dry or wet weight of the feed composition. According to certain embodiments, the amount of the at least one molasses is from about 7.5% to about 15% w/w out of the total dry or wet weight of the feed composition.

According to certain embodiments, the plant-derived flour is obtained from a plant selected from the group consisting of corn, wheat, rye, acorn, oat, almond, amaranth, banana, bean, crown rice, buckwheat, cassava, chestnut, chuno, coconut, coffee, cornmeal, glutinous rice, hemp, mesquite, nut, peas meal or pea, peanut, potato starch, rice, sorghum, tapioca, teff, soybean, arrowroot, taro, cattails, acorns, manioc, quinoa, and other grinded grains, roots, beans, nuts or seeds, and any combination thereof. Each possibility represents a separate embodiment of the present invention.

According to some embodiments, the feed composition comprises corn flour. According to certain embodiments, the feed composition comprises wheat flour.

According to certain embodiments, the at least one flour is added to the feed composition formulated as a ready-to-use composition at a content of from about 1% to about 20% w/w based on the total wet weight of the composition. According to certain embodiments, the content of the at least one flour is from about 1% to about 10% w/w based on the total wet weight of the composition. According to certain exemplary embodiments, the content of the at least one flour is from about 2.5% to about 7.5% w/w based on the total wet weight of the composition.

According to certain embodiments, the at least one flour is added to the feed composition formulated as a dry premixed composition at a content of from about 10% to about 95% w/w based on the dry weight of the composition. According to certain embodiments, the content of the at least one flour is from about 20% to about 80% w/w based on the dry weight of the composition. According to certain exemplary embodiments, the content of the at least one flour is from about 50% to about 70% w/w based on the dry weight of the composition.

According to some embodiments, the feed composition comprises yeast. Any yeast approved for human consumption can be used according to the teachings of the present invention. According to certain currently exemplary embodiments, the yeast is *Saccharomyces cerevisiae*. According to certain embodiments, the yeast is *Saccharomyces pastorianus*. According to other embodiments, the yeast is compressed yeast. According to certain embodiments, the yeast is selected from the group consisting of cream yeast, instant yeast, rapid-rise yeast, deactivated dry yeast and any combination thereof. Each possibility represents a different embodiment of the present invention. According to certain exemplary embodiments, the yeast is deactivated dry yeast.

According to certain embodiments, dry yeast content in the feed composition formulated as a ready-to-use composition is from about 0.5% to about 10% w/w based on the total wet weight of the composition. According to certain exemplary embodiments, the dry yeast content is from about 0.5% to about 5% w/w based on the total wet weight of the composition. According to certain exemplary embodiments, the dry yeast content is from about 0.5% to about 2% w/w based on the total wet weight of the composition.

According to certain embodiments, dry yeast content in the feed composition formulated as a dry premixed composition is from about 1% to about 40% w/w based on the dry weight of the composition. According to certain exemplary embodiments, the dry yeast content is from about 5% to about 30% w/w based on the total wet weight of the composition. According to certain exemplary embodiments, the dry yeast content is from about 5% to about 15% w/w based on the dry weight of the composition.

According to certain exemplary embodiments, the carbohydrate and protein source comprises a combination of at least one molasses type, corn meal, and yeast extract. According to certain exemplary embodiments, the content of the carbohydrate and protein source in the feed composition formulated as a ready-to-use composition is from about 8% to about 65% out of the total wet weight of the feed composition. According to certain exemplary embodiments, the content of the carbohydrate and protein source in the feed composition formulated as a dry premixed composition is from about 50% to about 99% out of the total wet weight of the feed composition.

According to certain embodiments, the feed composition formulated as a ready-to-use composition comprises high content of aqueous solution, wherein the feed composition is devoid of a liquid phase. According to certain exemplary embodiments, the aqueous solution is water. According to certain embodiments, the feed composition comprises aqueous solution at a concentration of at least 35%, at least 40%, at least 45%, at least 50%, at least 60%, at least 65%, at least 70%, at least 75%, at least 80%, at least 85% or at least 90% w/w based on the total wet weight of the composition.

According to another aspect, the present invention provides a method for inducing a suspended animation state in a fly neonate larva, comprising placing fly egg and/or larva on a feed composition inducing suspended animation, the composition comprising insect larva-compatible preservative and at least one gelling agent.

The feed composition inducing suspended animation is as described hereinabove.

According to certain embodiments, the method comprises placing a plurality of eggs and/or neonate larvae on the feed composition. According to these embodiments, the larvae are placed at a density of from about 50 to about 5000 larvae per $cm^2$ of feed composition. According to certain embodiments, the larvae are placed at a density of from about 100 to about 3000 larvae per $cm^2$ of feed composition. According to certain exemplary embodiments, the larvae are placed at a density of from about 500 to about 2000 larvae per $cm^2$ of feed composition. According to certain embodiments, the plurality of eggs is placed at a density as to reach larvae density of from about 50 to about 5000 larvae per $cm^2$ of feed composition. According to certain exemplary embodiments, the eggs are placed at a density as to reach larvae density of from about 100 to about 3000 larvae per $cm^2$ of feed composition. According to certain exemplary embodiments, the eggs are placed at a density as to reach larvae density of from about 500 to about 1500 2000 larvae per $cm^2$ of feed composition.

According to certain embodiments, reaching the desired larvae density comprises placing the fly eggs at about 10% higher density compared to said desired larvae density. For example, reaching a larvae density of 5,000 larvae per $cm^2$ of feed composition comprises placing eggs at a density of 5,500 eggs per $cm^2$ of feed composition. According to certain embodiments, the larva induced to suspended animation state remains viable for at least one week while placed on the feed composition inducing suspended animation. According to certain embodiments, the suspended-animation induced larva remains viable for at least 14 days while placed on the feed composition inducing suspended animation. According to certain embodiments, the suspended animation induced larva remains viable for at least three weeks while placed on the feed composition inducing suspended animation. According to certain embodiments, the suspended animation induced larva remains viable for at least 4 weeks while placed on the feed composition inducing suspended animation. According to certain embodiments, the suspended animation induced larva remains viable for at least 8 weeks while placed on the feed composition inducing suspended animation. According to certain embodiments, the suspended animation induced larva remains viable for at least 10 weeks, at least 11 weeks, at least 12 weeks, at least 15 weeks or at least 20 weeks while placed on the feed composition inducing suspended animation. Each possibility represents a separate embodiment of the present invention.

According to certain embodiments, neonate larva, particularly fly neonate larva, BSF larva being an exemplary embodiment, feeding of the feed composition inducing suspended animation, remains viable for at least 7 days, at least 10 days, at least 15 days, at least 20 days, at least 25 days or at least 30 days, at least 40 days, at least 45 days, at least 50 days, at least 55 days, at least 60 days, at least 65 days, at least 70 days, at least 75 days, at least 80 days, at least 85 days, at least 90 days, at least 95 days, at least 100 days, least 110 days, least 120 days, least 130 days, or up to about least 140 days. Each possibility represents a separate embodiment of the present invention. According to further embodiments, the neonate larva feeding of the suspended animation feed remains viable and at the first instar developmental stages.

According to certain embodiments, fly neonate larvae feeding of the feed composition inducing suspended animation are less susceptible to varying weather conditions. According to certain exemplary embodiments, the fly neonate larvae feeding of the feed composition show increased resistance to ambient cold temperatures.

According to certain embodiments, the larvae ambient temperature is from about 4° C. to about 35° C. It is to be understood that as defined hereinabove, the larva or larvae ambient temperature refers to the temperature of the environment of the larvae, which can be the air temperate when the larvae are placed on an open surface, the temperature measured within a container in which the larvae are placed or the temperature of an incubator within the larvae are placed wither on an open surface or within a container. According to certain embodiments, the larvae ambient temperature is constant during the entire period of the suspended animation state induced by the feed composition of the invention. According to certain embodiments, the larvae ambient temperature is from about 10° C. to about 30° C. According to certain exemplary embodiments, the larvae ambient temperature is from about 22° C. to about 30° C.

According to certain embodiments, the larvae ambient temperature is varied during the period of the suspended animation state induced by the feed composition of the invention. According to these embodiments, the larvae ambient temperature is from about 20° C. to about 30° C. at a first growing period of from about 0 days after hatching to about 2 days, from about 0 days after hatching to about 4 days or from 0 days after hatching to about 7 days after hatching; and from about 4° C. to about 30° C. thereafter at a second growing period until the larvae reach the desired size.

According to another aspect, the present invention provides a system for shipment and/or storage of beneficial fly larvae, comprising a container; feed composition inducing suspended animation comprising at least one insect larva-compatible preservative and at least one gelling agent; and a plurality of neonate larva.

The composition inducing suspended animation is as described hereinabove.

According to certain embodiments, the system is suitable for storage of the beneficial fly larvae in a viable state for from about 7 days to about 20 weeks. According to certain embodiments, the system is suitable for storage of the beneficial fly larvae in a viable state for from about 14 days to about 16 weeks, from about 21 days to about 12 weeks or from about 30 days to about 10 weeks. Each possibility represents a separate embodiment of the present invention.

Any container at any shape can be used with the system of the present invention as long as the container allows for gas exchange between the container and its surrounding environment while limiting the humidity evaporation from the feed composition. According to certain embodiments, the container comprises at least one wall comprised of at least partly perforated material.

According to certain exemplary embodiments, the system comprises a container comprising a flat bottom intact wall, and a wall comprised of at least partially perforated material at the top of the container. According to these embodiments, the system comprises a container comprising the feed composition inducing suspended animation at the bottom of the container, neonate larvae and/or eggs on top of the feed, void volume sufficient to contain oxygen and relatively uniform moisture, and a top wall comprised of at least partially perforated material.

The following examples are presented in order to more fully illustrate some embodiments of the invention. They should, in no way be construed, however, as limiting the broad scope of the invention. One skilled in the art can readily devise many variations and modifications of the principles disclosed herein without departing from the scope of the invention.

EXAMPLES

Example 1: Feed Composition Inducing Suspended Animation

The ingredients of an exemplary feed composition inducing suspended animation state include agar, corn flour, dry yeast, molasses, methylparaben, propionic acid and water.

The composition was prepared as follows:
1. Agar (about 0.5% w/w), corn flour (6.5% w/w) and 95% of the water (final water content of about 83% w/w) were combined and boiled for 10 min. In another exemplary composition the final water composition was about 42% w/w (such as in FIG. 4)
2. Molasses (about 9% w/w) was added and the composition was stirred for 5 min.
3. Yeasts (dry yeast, about 1% w/w) were added.
4. The temperature of the composition was reduced to 65° C. and the rest of the water was added.
5. Methylparaben (about 0.1-0.15% w/w) and propionic acid (in a liquid form, about 0.4% w/w) were added.

The composition was then dispensed into growing boxes with lid that enables gas exchange and prevents larval exit (5×5×10 cm plastic bottle with high density cellulose acetate lid). Total protein content in the composition was about 8% from the dry matter.

Example 2: Inducing Suspended Animation in Larvae of Black Soldier Fly (BSF)

BSF embryos were collected right after egg lying and up to 12 h after egg laying. The embryos were incubated at 30° C. and >80% humidity. Up to 4-8 h after hatching, the neonates (small larvae) were counted (25,000 per experiment) and moved into a bottle containing 40 ml feed composition inducing suspended animation prepared as described in Example 1 hereinabove. The bottles were placed in an incubator/heating plate set to 22-25° C. 65% humidity. Another sample with similar number of neonates served as a control, and were initially grown on a solid composition comprising plant flour mix based on soy flour with about 40-50% protein (from dry matter), for 4 days and then moved to grow on chickfeed. The control larvae were grown at 30° C. and 65% humidity After 4 days (for larvae grown on regular feed) or 14 days (for larvae grown on feed composition inducing suspended animation), the larva as well as the remains of feed were transferred into a box with 0.5 kg wet chick-feed (18.5% protein, Tadmir Israel) for 5-7 days and kept at 28° C., 60% humidity. Thereafter, the larva as well as the remains of feed were transferred into a bigger box with 6 kg wet chick-feed (18.5% protein, Tadmir Israel) added in two rounds of feed. After 8-10 days, when the larvae have reached 5 instar stage, the larvae were harvested and counted. The control larvae underwent same procedure except the first 0.5 kg feed.

Figure 1A:
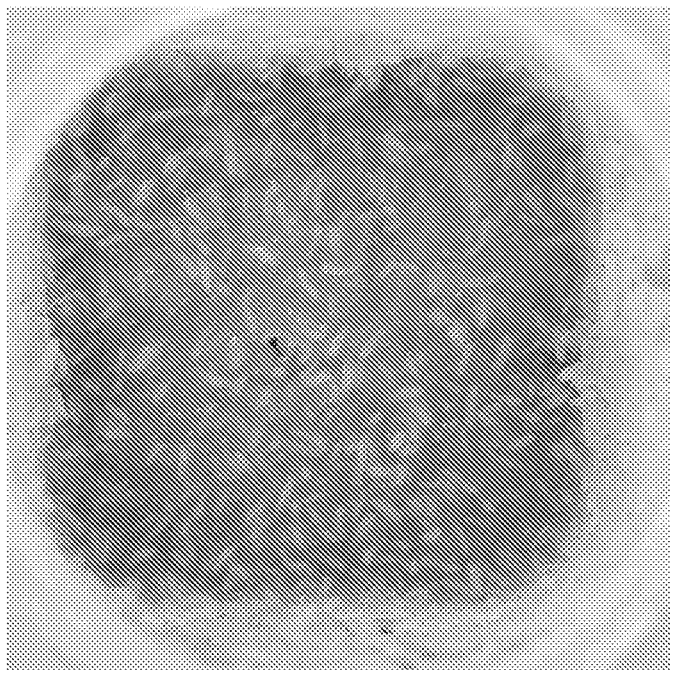

FIG. 1 shows larvae placed and grown on a standard solid feed composition (FIG. 1A) and on the feed composition inducing suspended animation state of the invention (FIG. 1B). As is clearly demonstrated, the growth of the larvae grown on the composition of the invention was arrested, while larvae feed on standard feed show significant growth.

Figure 2:
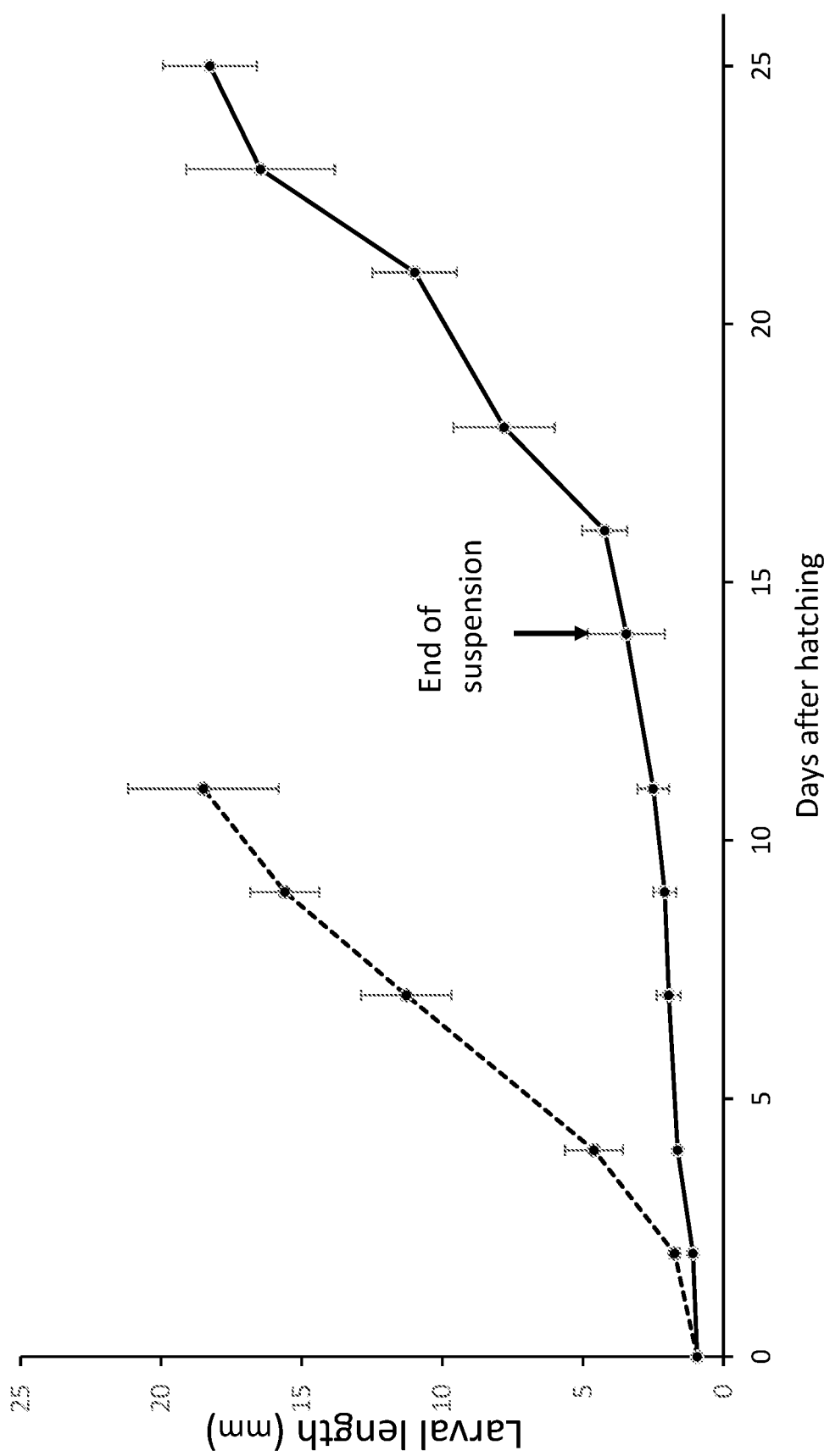
FIG. 2 portrays average length in mm of larvae grown for 14 days-after hatching on feed composition inducing suspended animation (solid line) or on standard feed (dashed line).

FIG. 2 shows the growth curve presented as an average larva length of larvae grown on control feed as described above, and larvae grown on the feed composition inducing suspended animation of the invention for 14 days and then transferred to grow on the standard chick-feed for additional as described above. The figure demonstrates that the suspended animation state induced by the feed composition of the invention is reversible: within 9 days after transfer to standard feed, the larvae regained growth and reached the similar average length as the larvae grown on standard feed only.

Figure 3A:
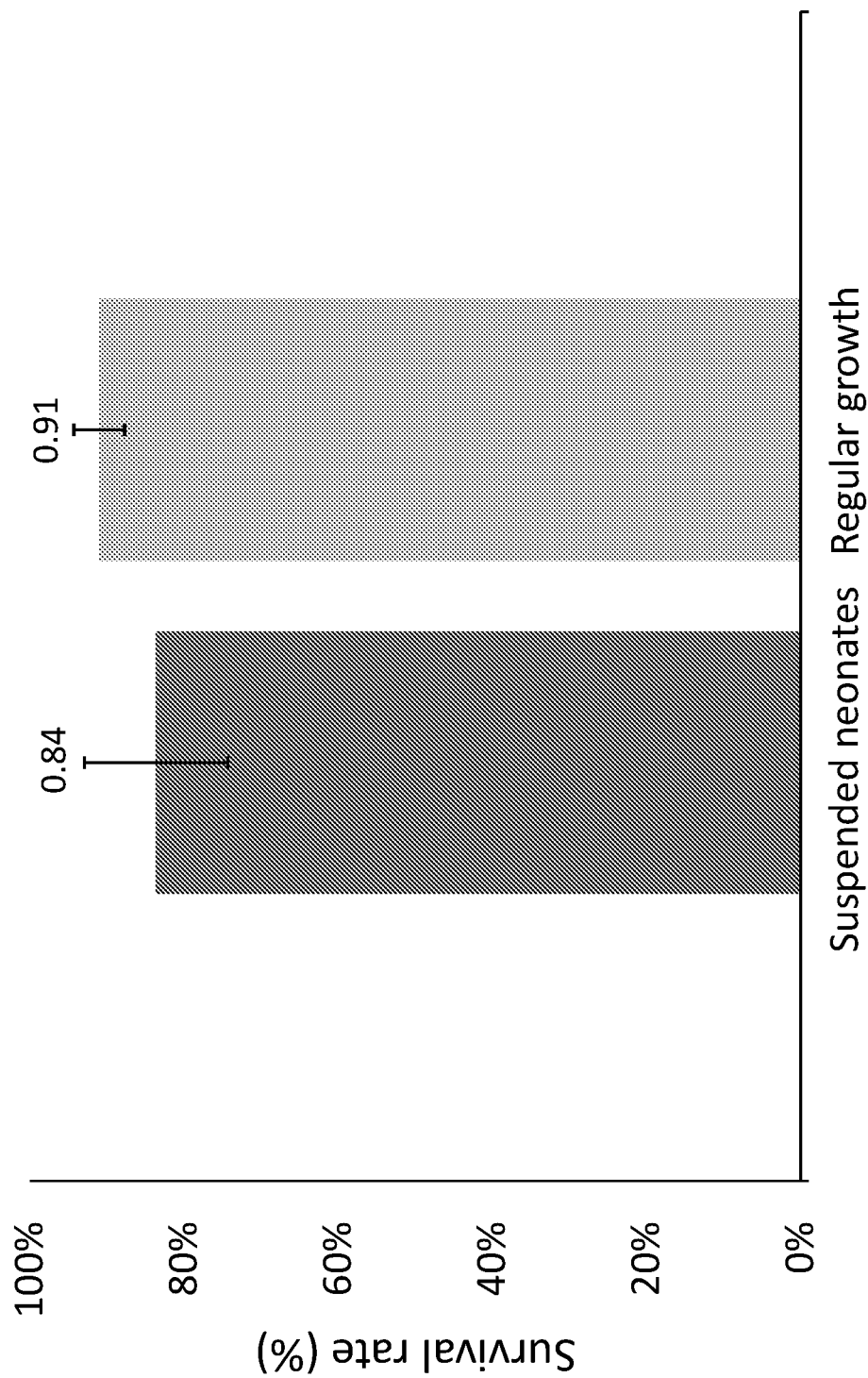
FIG. 3A shows the percentage of survival rate until $5^{th}$ instar stage of larvae grown on a feed composition with about 83% water inducing suspended animation state ("Suspended Neonates") for 14 days at 25° C. and then transferred to grow on standard feed for 14-16 days; and of larvae grown on standard feed composition ("Regular Grown") for the entire growth period of 13-16 days.
Figure 3B:
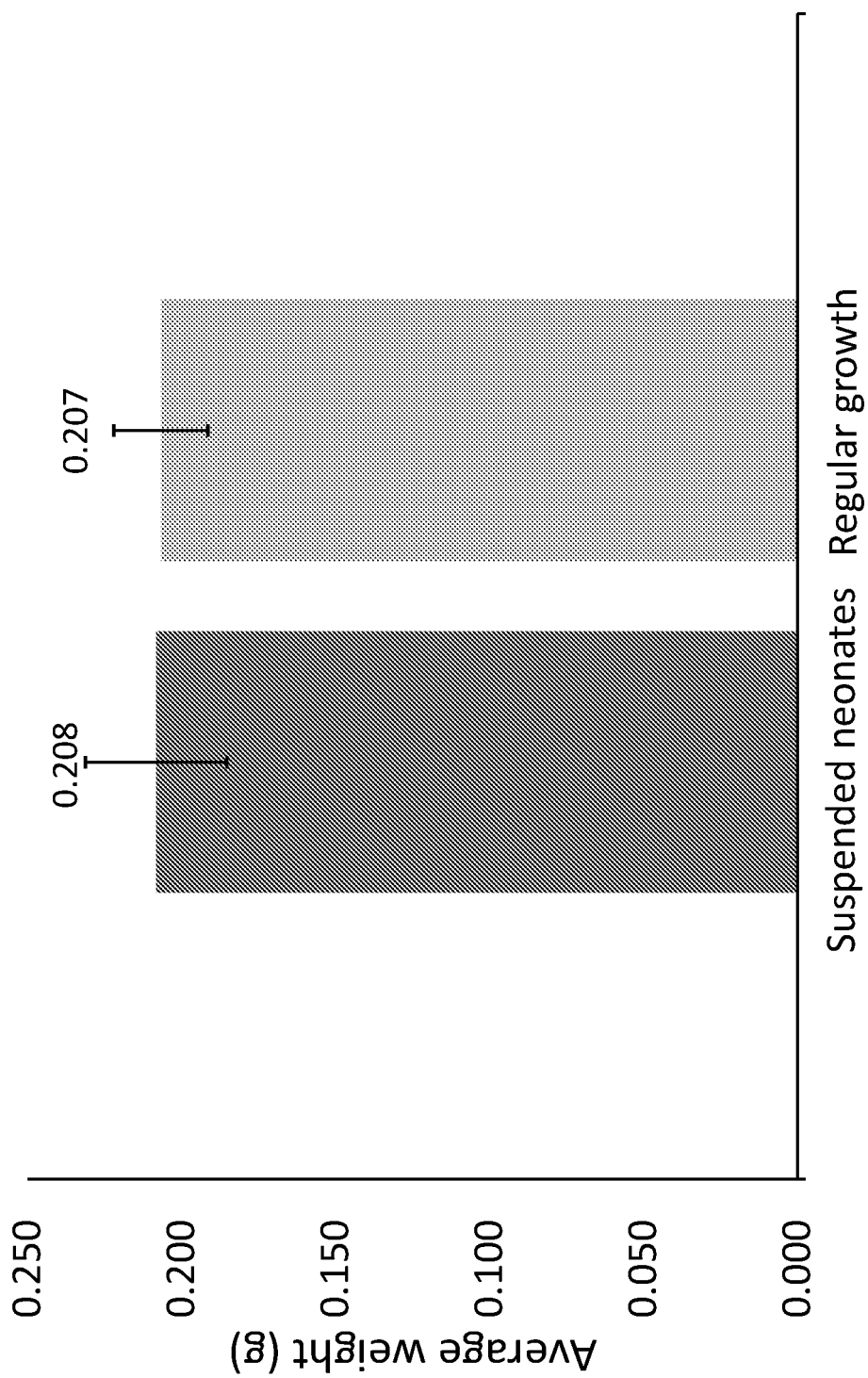
FIG. 3B shows the average weight of the $5^{th}$ instar stage larvae induced for suspended animation state or grown on standard feed composition as described in FIG. 3A.
Figure 4A:
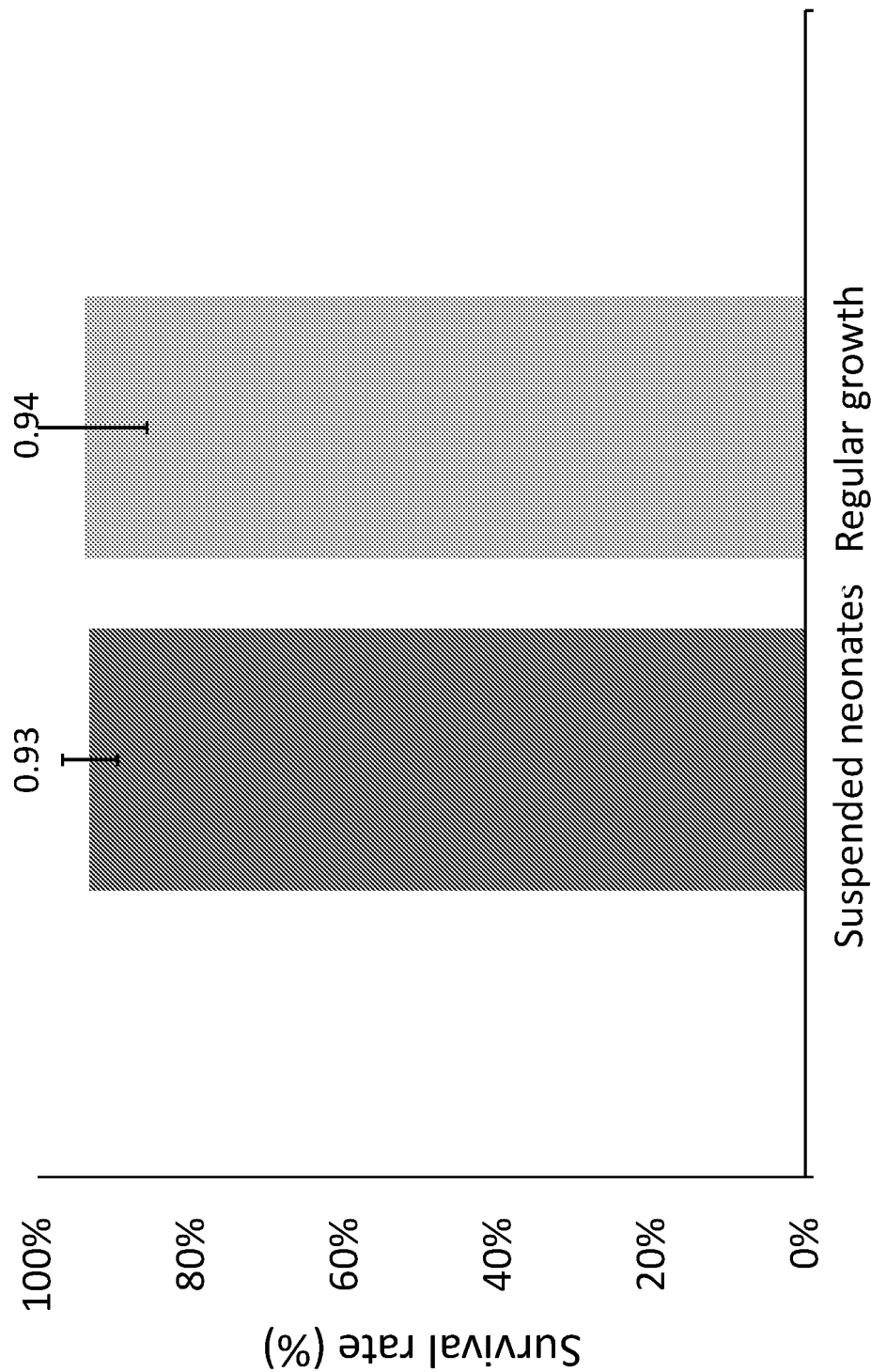
FIG. 4A shows the percentage of survival rate until $5^{th}$ instar stage of larvae in a similar manner like in FIG. 3A, but wherein the suspension feed comprises about 50% less water.
Figure 4B:
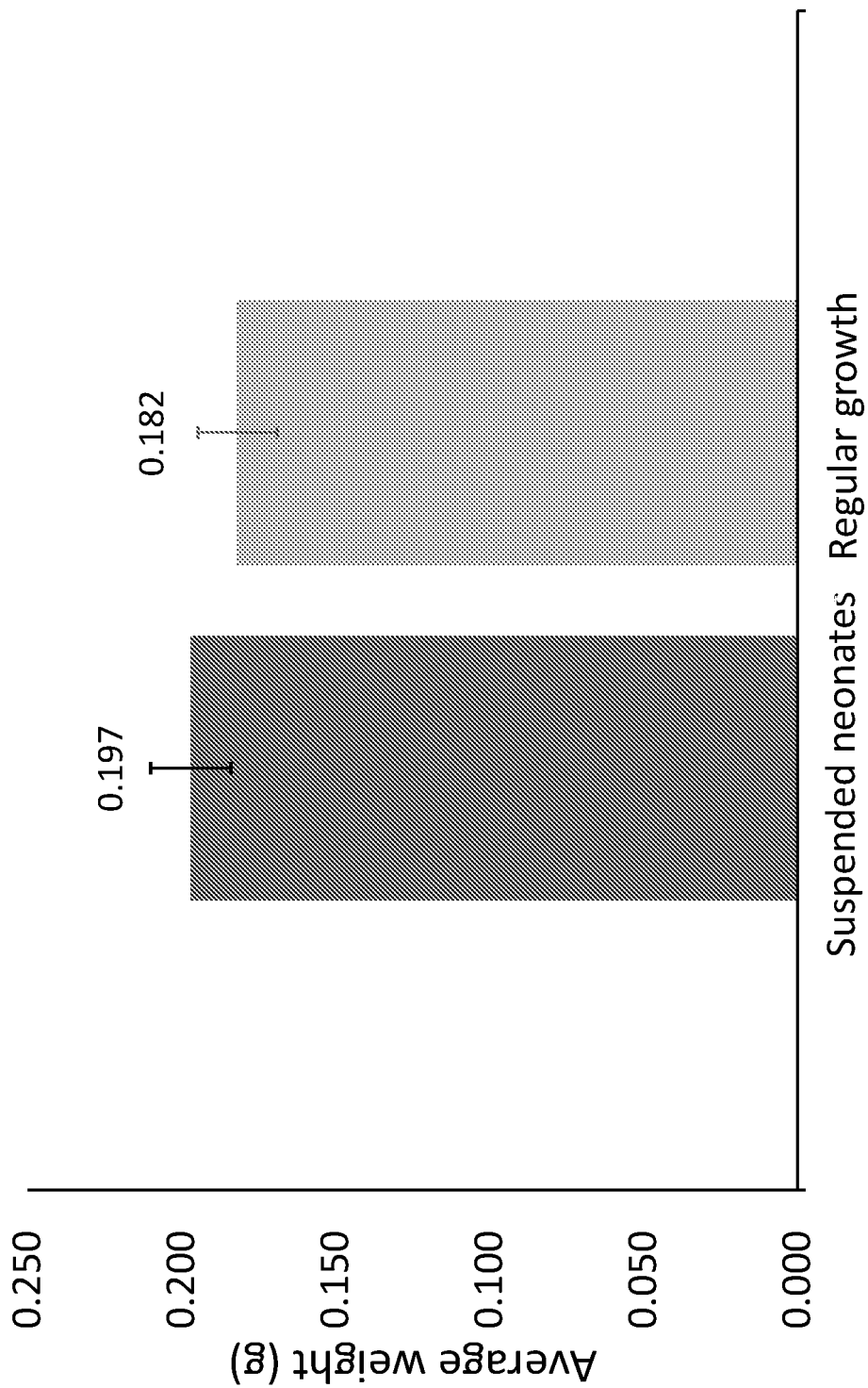
FIG. 4B shows the average weight of the $5^{th}$ instar stage larvae induced for suspended animation state or grown on standard feed composition as described in FIG. 4A.
Figure 5A:
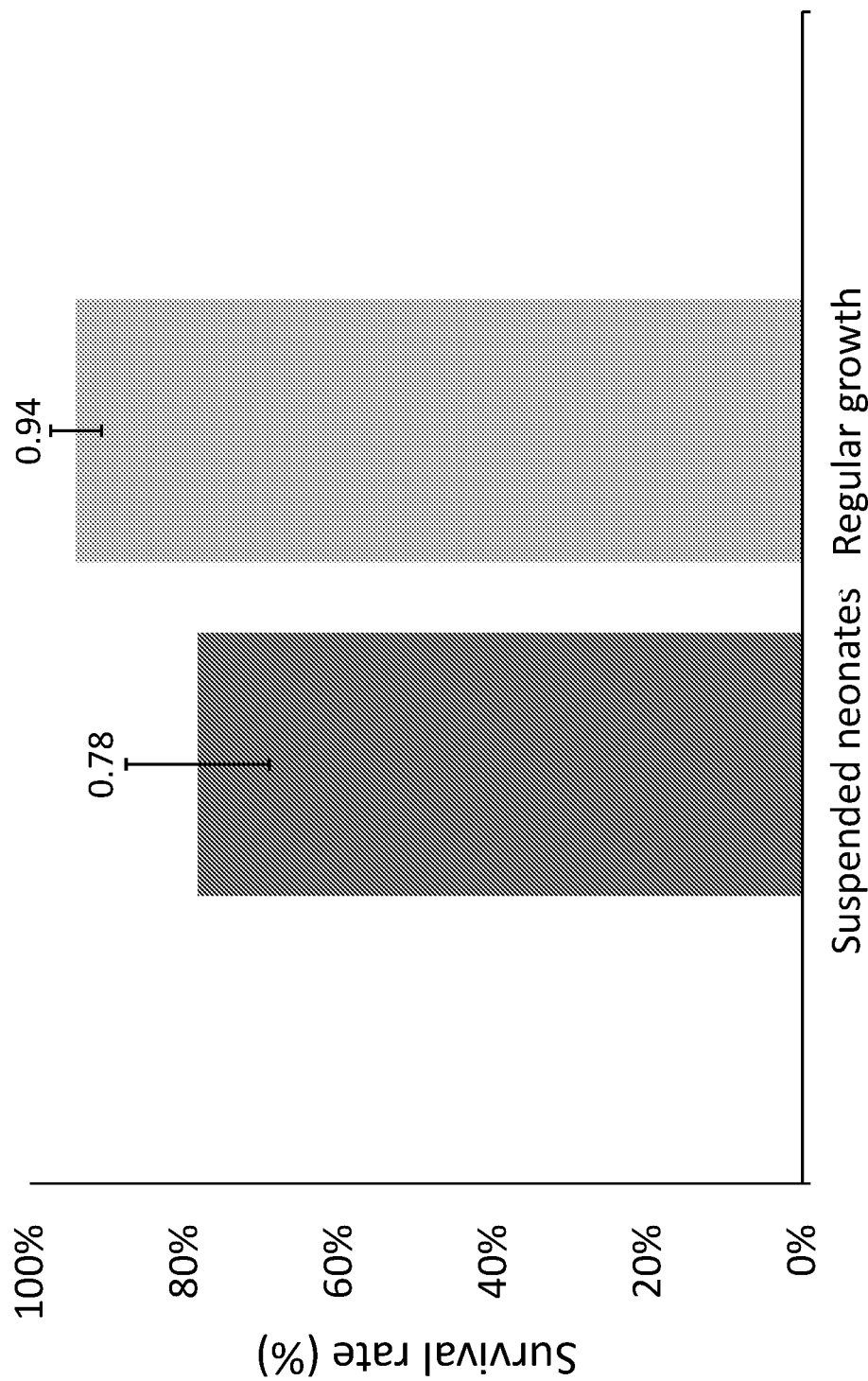
FIG. 5A shows the percentage of survival rate until $5^{th}$ instar stage of larvae grown in a similar manner like in FIG. 3A, but wherein the suspension step performed at 22° C.
Figure 5B:
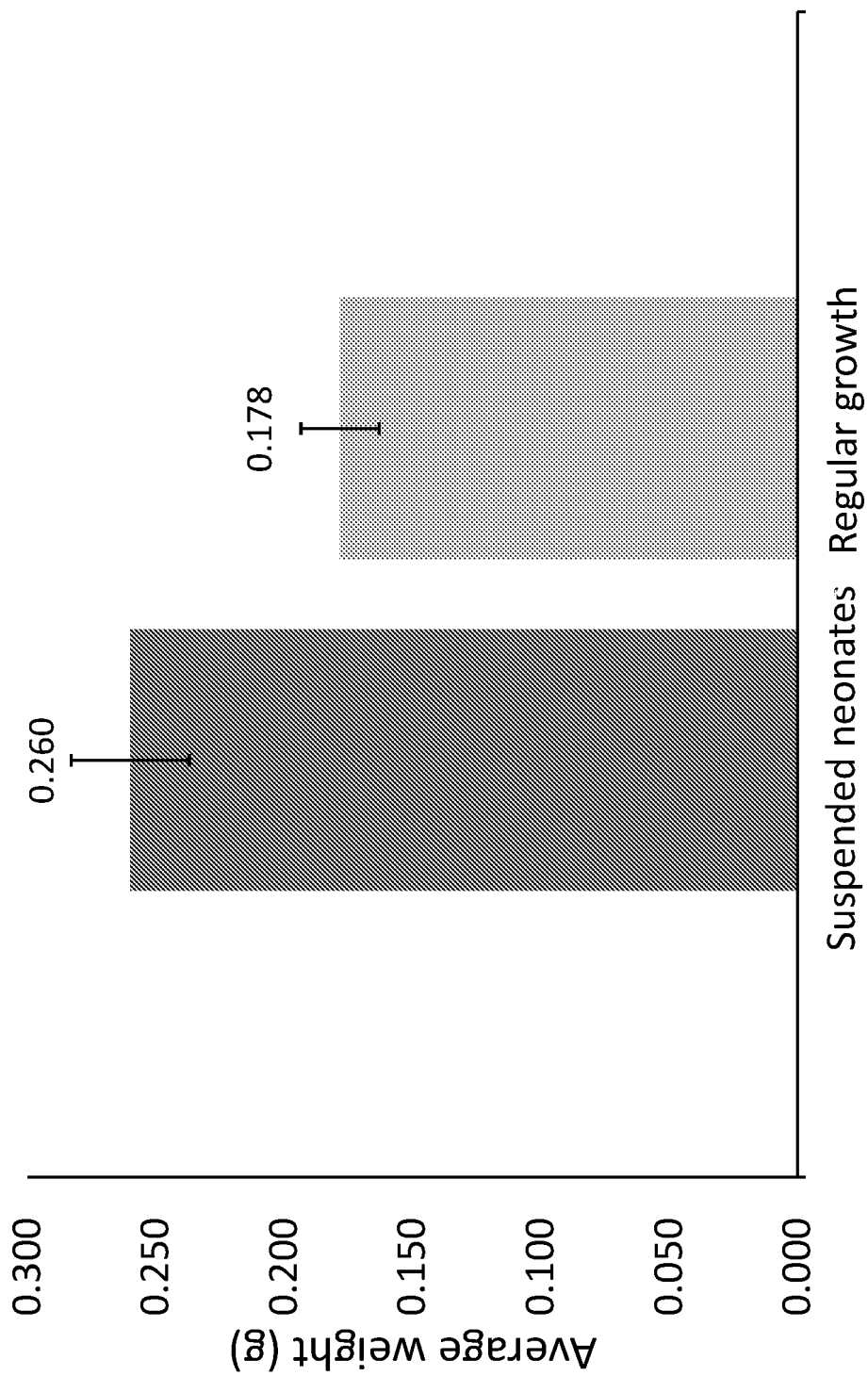
FIG. 5B shows the average weight of the $5^{th}$ instar stage larvae induced for suspended animation state or grown on standard feed composition as described in FIG. 5A.
Figure 6:
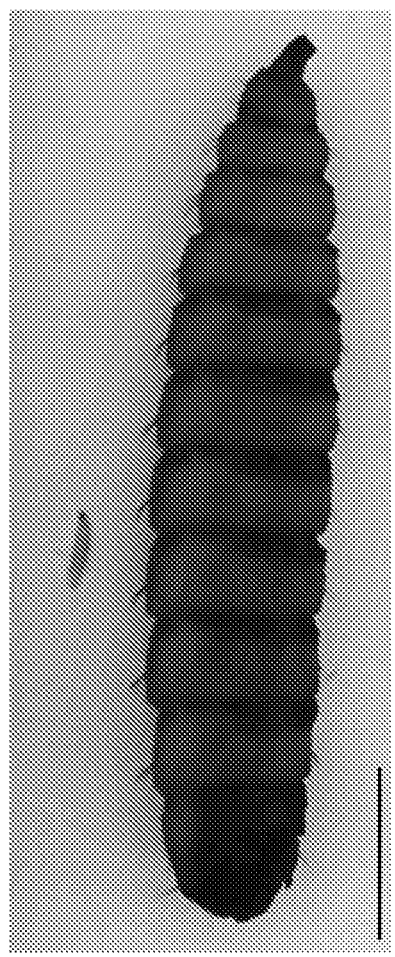
FIG. 6 presents 14 days old larvae grown on standard feed at the bottom or on the feed composition for inducing suspended animation on the top of the image. Scale bar indicate 5 mm.

FIGS. 3, 4, and 5 further demonstrate that the induction of suspended animation state is reversible, and once the larvae were transferred to grow on standard solid feed the larvae displayed survival rate at fifth instar stage (FIG. 3A, FIG. 4A and FIG. 5A) and average weight (FIG. 3B, FIG. 4B and FIG. 5B) comparable to that of larvae grown on the standard solid feed (chick-feed) for the entire growth period. In FIG. 3 the larva suspension step was maintained at 25° C. and the suspension feed contained about 83% water. In FIG. 4, the larva suspension step was maintained at 22° C. and the suspension feed contained about 83% water. In FIG. 5 the larva suspension step was maintained at 25° C. and the suspension feed contained about 42% water. FIG. 6 shows a representative picture of a larva grown on the feed composition inducing suspended animation (FIG. 6, top of the image) and of a larva grown on the regular feed (on the bottom).

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

The invention claimed is:

1. A method for delaying maturation of *Hermetia illucens* comprising:
    inducing a suspended animation state of a prolonged first/second instar larval stage of in *Hermetia illucens* (Black soldier fly) neonate larva, comprising placing one or more *Hermetia illucens* egg and/or neonate larva on a feed composition inducing a suspended animation state of a prolonged first/second instar larval stage for 7-14 days, wherein the feed composition comprises at least one insect-larva compatible preservative selected from the group consisting of a food-grade or cosmetic grade paraben, propionic acid, and a combination thereof and at least one gelling agent, wherein said feed composition is in a semi-solid or solid gel form comprising at least 35% w/w aqueous solution based on the wet weight of the feed composition, thereby inducing the suspended animation state of a prolonged first/second instar larval stage for 7-14 days in the *Hermetia illucens* neonate larva; and
    transferring the neonate larva from the feed composition inducing suspended animation state to a common rearing feed without a paraben or propionic acid and comprising at least 18% protein w/w based on the dry weight of the feed composition, whereby the neonate larva develops normally throughout the remaining larval stages.

2. The method of claim 1, wherein the feed composition comprises at least one carbohydrate and at least one protein or at least one source thereof, wherein the protein content is up to 20% w/w based on the dry weight of the feed composition.

3. The method of claim 1, wherein the neonate larva placed on the feed composition is at the first instar developmental stage, or wherein the neonate larva is placed on the feed composition within a time period selected from the group consisting of right after hatching to about 24 h after hatching and right after hatching to about 12 h after hatching.

4. The method of claim 1, wherein the neonate larva consumes the feed composition.

* * * * *